(No Model.) 2 Sheets—Sheet 1.

W. E. ANDREW.
COMBINED TRAP AND SEAL FOR WATER CLOSETS.

No. 395,109. Patented Dec. 25, 1888.

WITNESSES,
Percy C. Bowen
Fannie Wise.

INVENTOR
William E. Andrew,
By Joseph Lyons,
Attorney (No Model.) 2 Sheets—Sheet 2.

W. E. ANDREW.
COMBINED TRAP AND SEAL FOR WATER CLOSETS.

No. 395,109. Patented Dec. 25, 1888.

WITNESSES:

INVENTOR
William E. Andrew,
By Joseph Lyons,
Attorney

UNITED STATES PATENT OFFICE.

WILLIAM E. ANDREW, OF ATLANTIC HIGHLANDS, NEW JERSEY.

COMBINED TRAP AND SEAL FOR WATER-CLOSETS.

SPECIFICATION forming part of Letters Patent No. 395,109, dated December 25, 1888.

Application filed October 17, 1888. Serial No. 288,320. (No model.)

*To all whom it may concern:*

Be it known that I, WILLIAM E. ANDREW, a citizen of the United States, residing at Atlantic Highlands, in the county of Monmouth and State of New Jersey, have invented certain new and useful Improvements in Combined Traps and Seals for Water-Closets, of which the following is a specification.

My invention has reference to traps and seals for water-closets, wash-basins, baths, and other similar structures, the object being to provide an effective and reliable seal against obnoxious sewer-gases, so as to prevent the latter to reach the premises where the water-closet or wash-basin is located. Heretofore seals of this character were ordinarily formed by a body of water held in a trap made by a bend in the discharge-pipe below the outlet to the sewer-connection, and their effectiveness depended upon the fact that said body of water had first to be displaced before the sewer-gases could enter the premises. Such displacement of the ordinary water-seal, however, occurs very frequently, either by reason of the fact that the gas-pressure at times becomes abnormally great, or because the flush of water frequently converts such trap into a siphon, whereby the whole seal is completely removed. By my invention such accidents are avoided, since the seal in this case is formed by valves or gates which are held in place either by the pressure of a spring or weight, and the latter may be supplied either by a solid fixed weight or by a continuously-supplied body of water. Especially in the latter case the pressure upon the valves or gates may be increased to any desired extent, and the arrangement is such that when a spring or the weight of a solid body is used for closing the valves or gates the pressure of the sewer-gases acts to force the valves against their seats. In this way the circumstances which in other traps conspire to make the seal uncertain and ineffective are made in my improvement to aid in making the same secure and effective. All this will more fully appear from the following detailed description, in which reference is made to the accompanying drawings, and in which I have shown, in—

Figure 1:
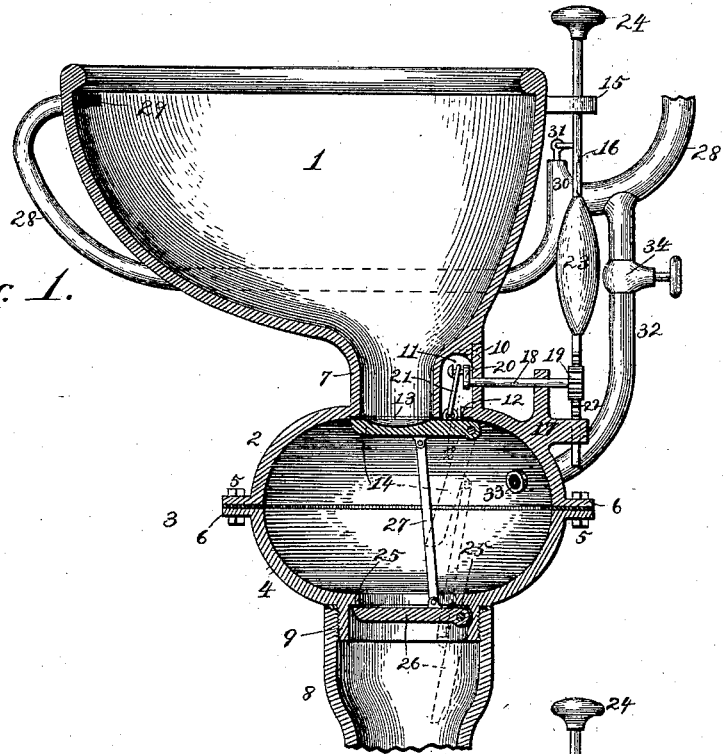
Figure 2:
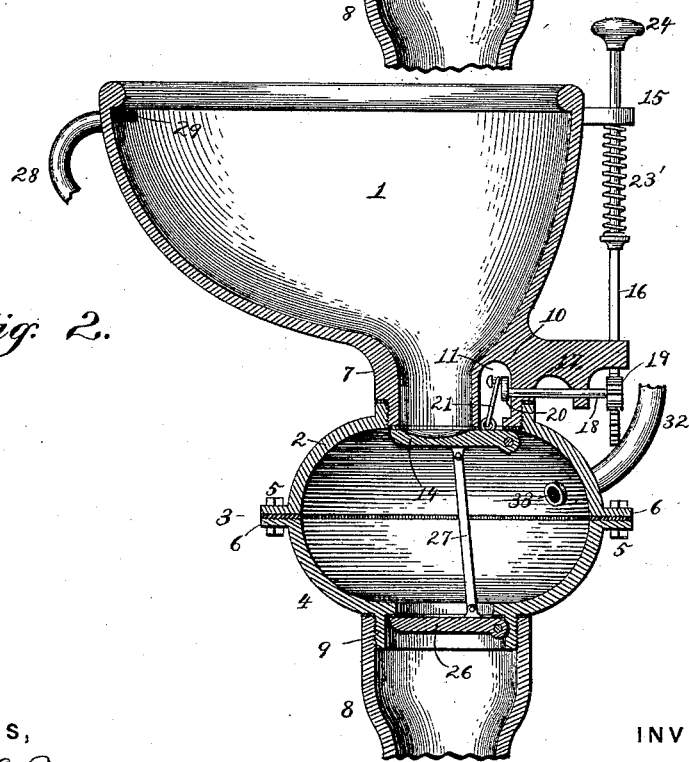
Figure 3:
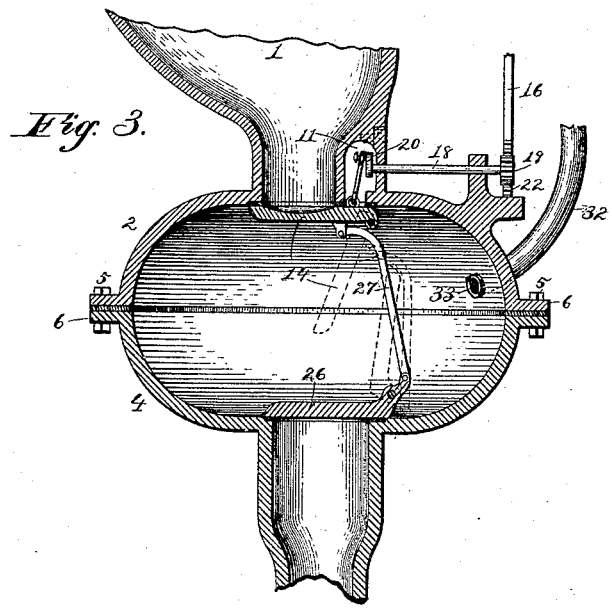
Figure 4:
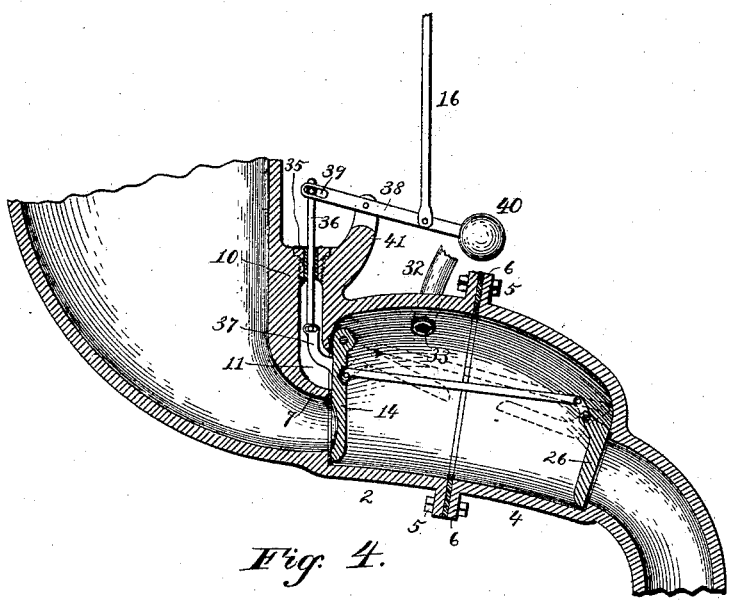

Figure 1, a sectional elevation of my improvement when the weight of a solid body is employed for closing the valves, and in Fig. 2 a like view of my trap-seal, wherein spring-pressure is employed for closing the valves. Fig. 3 is a sectional elevation of a trap-seal in which the valves are closed by lever or water pressure; and Fig. 4 is a like view of a modified form of the same.

Referring now more particularly to Fig. 1, the bowl 1 of a water-closet, which will be made of cast metal, earthenware, or other suitable material, is there shown as cast in one piece with one half, 2, of a spherical or ellipsoidal trap, 3, the other half, 4, of which trap is secured to the former by screw-bolts 5 passing through flanges 6, formed around the edges of the two halves of the trap. A neck, 7, connects the bowl with the upper half of the trap, and the waste or discharge pipe 8 is screwed to or otherwise connected with the lower half of the trap, where for this purpose a screw-threaded neck, 9, is formed.

The body of the bowl is thickened from a point above the neck 7 on one side down to the lower end of said neck, as shown at 10, and a recess, 11, formed in the thickened portion 10, communicates with the upper half of the trap. A ledge, 12, projecting from the body of the upper half, 2, of the trap into the recess 11, has its lower face in the same plane with the edge 13 of neck 7, and a valve or gate, 14, pivoted below said ledge 12 within the upper half of the trap, is adapted, when in the position indicated in dotted lines, to close the neck and at the same time the opening by which recess 11 communicates with the trap. In order to make a close fit, a washer of leather or other suitable material may be interposed between the valve and the edge of the neck and also between the valve and the under side of ledge 12; but this is not absolutely necessary; and while such washer is indicated in the drawings its mode of attachment will not be specifically described.

From the outer side of bowl 1, near its upper edge, projects a lug, 15, which serves as a guide for the lifting-rod 16, and the horizontal arm of an angular bracket, 17, extending from the body of the upper half of the trap, serves as a second guide for said rod, as shown.

The vertical arm of bracket 17 serves as one of the journal-bearings of a shaft, 18, the other journal-bearing of which is formed in the outer wall of recess 11. This shaft carries at its outer end a pinion, 19, and at its inner end a small crank, 20, provided with a wrist-pin, as shown, and a pitman, 21, connects the wrist-pin of crank 20 with an eye formed on the upper side of valve 14.

The opening by which recess 11 communicates with the trap is made large enough to admit the hand or suitable tools for attaching the crank 20 to the end of shaft 18 and for connecting the pitman to the wrist-pin of the crank. The lifting-rod is formed into a rack, 22, near its lower end, and the teeth of this rack engage the teeth of pinion 19, so that when the lifting-rod is moved up or down in its guides 15 17 the pinion will be rotated and the valve 14 will be moved to the positions shown in dotted and solid lines, respectively, by the intervention of the connecting mechanism. A weight, 23, carried by the lifting-rod, holds the same normally forcibly down in the position shown in the drawings, in which case the valve 14 is pressed against its seats, whereby the communication between the trap and the bowl is hermetically closed, while when the lifting-rod is raised by means of the knob 24 pinion 19 is rotated to turn the valve 14 to the position shown in dotted lines, so that now the contents of the bowl may discharge into the trap.

The body of the lower half, 4, of the trap projects a short distance within the neck 9, and there forms an annular ledge, 25, which constitutes a seat for the valve 26, pivoted within said neck 9, and a connecting-rod, 27, pivoted at one end to the under side of valve 14 and at the other end to the upper side of valve 26, causes the latter to open and to close when valve 14 opens and closes. This is clearly illustrated in Fig. 1 in dotted and solid lines, and it will now be clear that when the lifting-rod is raised both valves 14 and 26 will be opened, and when the lifting-rod is released and is forced down to its original position both valves will be closed by the pressure of the weight 23.

A flushing-pipe, 28, leading to a water-supply under pressure terminates at a suitable opening, 29, near the upper edge of the bowl, and a valve or cock, 30, in said pipe is opened and closed when the lifting-rod is raised or lowered, as is usual in water-closets. The connection of valve 30 with the lifting-rod is conventionally indicated at 31; but since this construction may be of any ordinary or preferred form it will not be specifically described. A branch pipe, 32, leading from the flushing-pipe opens into the upper half of the trap at 33, and this pipe furnishes a continuous water-supply under pressure to the trap. There is, however, a valve or cock, 34, placed in said pipe, so that the water may be turned off for repairs.

The operation of the mechanism will now be easily understood. Normally the apparatus will be in the condition shown in solid lines in Fig. 1, with the bowl partly filled with water, the two valves 14 and 26 closed, and the trap filled with water under pressure through branch pipe 32. The exposed surfaces of the two valves are either equal, in which case the water-pressure upon the same within the trap is balanced, and the valves are forced to their seats by the action of the weight 23 only; or, preferably, the exposed surface of valve 14 is in excess of that of valve 26, in which case the water-pressure within the trap acts positively to force the two valves to their seats in addition to the pressure produced by weight 23. If the exposed surface of valve 14 is made considerably greater than that of valve 26 the weight 23 may be altogether omitted, as will be readily understood by those skilled in the art. It will also be seen that the pressure of the sewer gases upon valve 26 will only act to force both valves more securely to their seats. If, now, the lifting-rod is raised, the two valves 14 26 and the flushing-valve 30 will be opened and the contents of the bowl of the trap will discharge. There is then a straight unobstructed passage, and both the flushing-pipe 28 and branch pipe 32 continue to discharge water into the bowl and into the trap, respectively, and the capacity of the flushing-pipe is such as to maintain a very nearly constant level of the water in the bowl, so that no sewer-gases can emerge through the bowl. When the lifting-rod is released, its weight will carry the valves back to their original position, and the branch pipe being always open the trap will soon be filled with water again, whereby the original condition is restored.

In the construction shown in Fig. 2, which in all essential features is like that shown in Fig. 1, a spring, 23', is used to take the place and perform the function of weight 23. The angular bracket 17 is in this case shown as projecting from the body of the bowl, which latter is cast in a separate piece from the upper half, 2, of the trap, which is screwed to the neck of the bowl. In all other respects the two constructions are practically identical.

In Fig. 3 the arrangement of the lower valve, 26, is different from that in Figs. 1 and 2, in that it is pivoted within the trap and opens inwardly. The valve is therefore constructed as a two-armed lever, and the connecting-rod 27 is suitably curved, as shown. In this case the pressures of the water from the branch pipe 32 upon the two valves conspire to close the same, and neither a weight nor a spring is required to force these valves against their seat. The head of water in branch pipe 32 may be quite small, and in fact should be quite small, for otherwise the force required for opening the valves would be too great.

In Fig. 4 my invention is shown as applied to a water-closet where the discharging-neck 7 is at one end of the bowl instead of near the center. In this case one half, 2, of the trap is cast in one piece with the bowl, as in Figs. 1 and 3, and the upper part of the trap is slightly arched. Both valves open inwardly, as in the construction shown in Fig. 3. Recess 11 in this case opens horizontally into the trap and then extends vertically into the thickened portion 10 of the bowl. This recess is closed above by a stuffing-box, 35, through which a reciprocating rod, 36, passes, and is connected at its lower end with an angular arm, 37, by a pin and slot, as shown, or in any other suitable manner. The upper end of rod 36 is connected with one end of a lever, 38, by a pin passing through a slot, 39, in the end of said lever. The free end of said lever may be provided with a weight, 40, to aid in returning the valves to their normal positions; but this weight may in most cases be dispensed with. Lever 38 is pivoted to a bracket, 41, rising from the thickened portion of the bowl, and the lifting-rod is connected with the outer arm of said lever.

As shown in the drawings, the two valves open inwardly and upwardly, leaving a clear passage for the contents of the bowl, and, as in the construction shown in Fig. 4, the valves are forced against their seats by the pressure of the water from branch pipe 32.

Having now fully described my invention, I desire it to be understood that I am not limited to the identical details of construction herein shown and described, since the same may be variously changed without departing from the fundamental idea embodied in the same.

I claim and desire to secure by Letters Patent—

1. In a combined trap and seal for water-closets, wash-basins, bath-tubs, and like structures, the combination of a trap-chamber interposed between the bowl and the sewer-connection, and valves for sealing the chamber in both directions, with a continuous water-supply for forcing the valves against their seats, and means for operating said valves simultaneously, substantially as described.

2. In a combined trap and seal for water-closets, wash-basins, bath-tubs, and like structures, the combination of a trap-chamber interposed between the bowl and the sewer-connection, and two valves connected for simultaneous operation for sealing the chamber in both directions, one of said valves opening into the trap-chamber and the other from said chamber and the exposed inner surface of the former in excess of that of the latter, with a continuous water-supply for the trap-chamber, whereby both valves are forced against their seats by the difference of water-pressure upon their exposed inner surfaces, substantially as described.

3. In a combined trap and seal for water-closets, the combination of a trap-chamber located between and communicating with the bowl of the closet and the sewer-connection at opposite ends, with two valves for controlling this communication, means for operating both valves simultaneously, and a continuous water-supply for keeping the trap-chamber filled and for forcing the valves against their seats, substantially as described.

4. In a combined trap and seal for water-closets, the combination of a trap-chamber interposed between the bowl and the sewer-connection, and valves for sealing the chamber in both directions, with a continuous water-supply for forcing the valves against their seats, substantially as described.

5. In a combined trap and seal for water-closets, wash-basins, bath-tubs, and like structures, the combination of a trap-chamber communicating with and constantly filled by a supply of water and interposed between the bowl or tub and the sewer-connection, with valves for sealing the chamber in both directions, substantially as described.

In testimony whereof I have signed my name to this specification in the presence of two subscribing witnesses.

WILLIAM E. ANDREW.

Witnesses:
V. K. REYNOLDS,
ALF. W. KINNAN.